United States Patent

[11] 3,589,211

| [72] | Inventor | Kenneth R. Douglas<br>3760 Davie Boulevard, Fort Lauderdale, Fla. 33312 |
|---|---|---|
| [21] | Appl. No. | 844,314 |
| [22] | Filed | July 24, 1969 |
| [45] | Patented | June 29, 1971 |

[54] AUTOMATIC TRANSMISSION
2 Claims, 2 Drawing Figs.

| [52] | U.S. Cl. | 74/752 |
|---|---|---|
| [51] | Int. Cl. | F16h 5/42 |
| [50] | Field of Search | 74/752 B, 752 B1, 752 |

[56] References Cited
UNITED STATES PATENTS

| 1,795,315 | 3/1931 | Molly | 74/752 B1 |
| 2,382,088 | 8/1945 | Moffitt | 74/752 B1 |
| 2,470,241 | 5/1949 | Diard | 74/752 B1 |
| 2,559,923 | 7/1957 | Alspaugh | 74/752 |
| 2,917,940 | 12/1959 | Voreaux | 74/752 |
| 3,115,792 | 12/1963 | Grattan | 74/752 |
| 3,327,565 | 6/1967 | Grattan | 74/752 |

Primary Examiner—C. J. Husar
Attorney—Eugene F. Malin

ABSTRACT: An automatic transmission with an automatically varying input/output ratio over a predetermined operating range having an input shaft, a controlled gear driven at a lower rotational rate than the input shaft, an operating mechanism coupling the input shaft to the controlled gear as a function of input rotational rate, and an output shaft coupled to the controlled gear. The output shaft rotates whenever the velocity of the controlled gear is increased above its lower driven rotational rate by coupling to the faster rotating input shaft. As the force coupling the input shaft to the controlled gear increases, the controlled gear rotates faster, until direct drive is achieved when the controlled gear is rotated at the same rate as the input shaft.

PATENTED JUN29 1971 3,589,211

INVENTOR
ERNST MARCUS
BY Hurwitz, Rose & Greene
ATTORNEYS

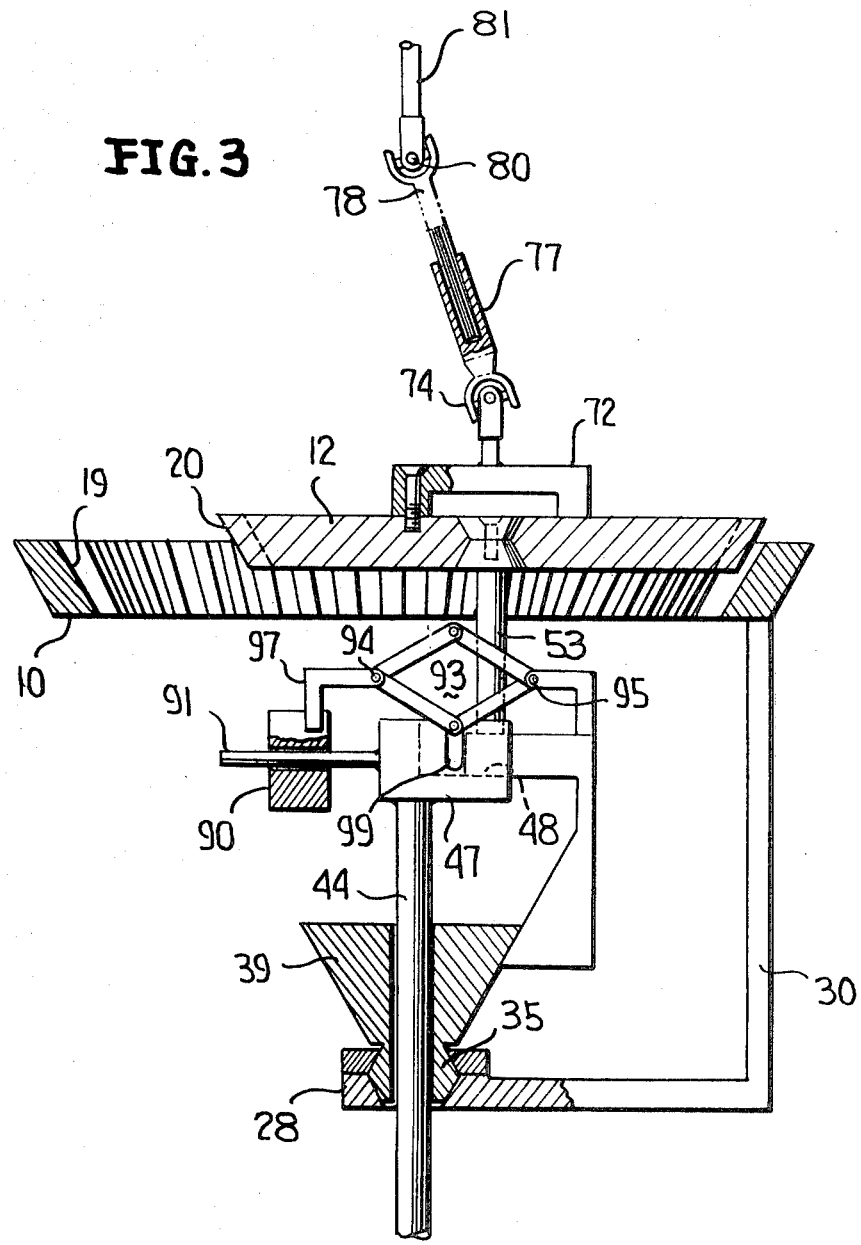

AUTOMATIC TRANSMISSION

BACKGROUND OF THE INVENTION

This invention relates generally to an automatic transmission having an infinitely variable gearing ratio over a predetermined vehicle operating range.

In the past, automatic transmissions providing automatic variable speed coupling of an input shaft to an output shaft have been very complicated and expensive to build. Such automatic transmissions are characterized as being replete with intricate clutching and gearing mechanisms.

BRIEF SUMMARY OF THE INVENTION

An automatic transmission having an input shaft, a controlled means driven at a rotational rate lower than that of the input shaft, an operating means for coupling the controlled means to the input shaft as a function of input rotation rate, and an output shaft coupled to the controlled means. The output shaft rotates when the rotation rate of the controlled means is increased above its lower rotational rate because of the coupling of the controlled means to the faster rotating input means by the operating means. As the coupling force increases, the controlled means rotates faster until direct drive is achieved when the controlled means is rotating at the same rate as the input shaft. At engine idle speed, the operating means does not provide a sufficient coupling force necessary to accelerate the controlled means, so that at idle speed the controlled means rotates at the initial lower rotational rate. The controlled means cooperates with the operating means to vary the input/output ratio as a function of input rotation rate and output demand. Due to the feedback of part of the input rotation driving the controlled mechanism at a lower rotational rate, the maximum rotational difference that the operating mechanism must overcome is relatively small when compared with the input rotation rate. Reverse is achieved by stopping the rotation of the controlled gear with a braking means. This will cause the output shaft to rotate in a direction opposite to that of the input shaft.

It is an object of this invention to provide an automatic transmission noncomplex in operation.

It is another object of this invention to provide an automatic transmission with improved fuel consumption characteristics.

It is still another object of this invention to provide an automatic transmission having an infinitely variable input/output gearing ratio over a predetermined operating range.

BRIEF SUMMARY OF THE DRAWINGS

Referring to the drawing.

PREFERRED EMBODIMENT OF THE INVENTION

Figure 1:
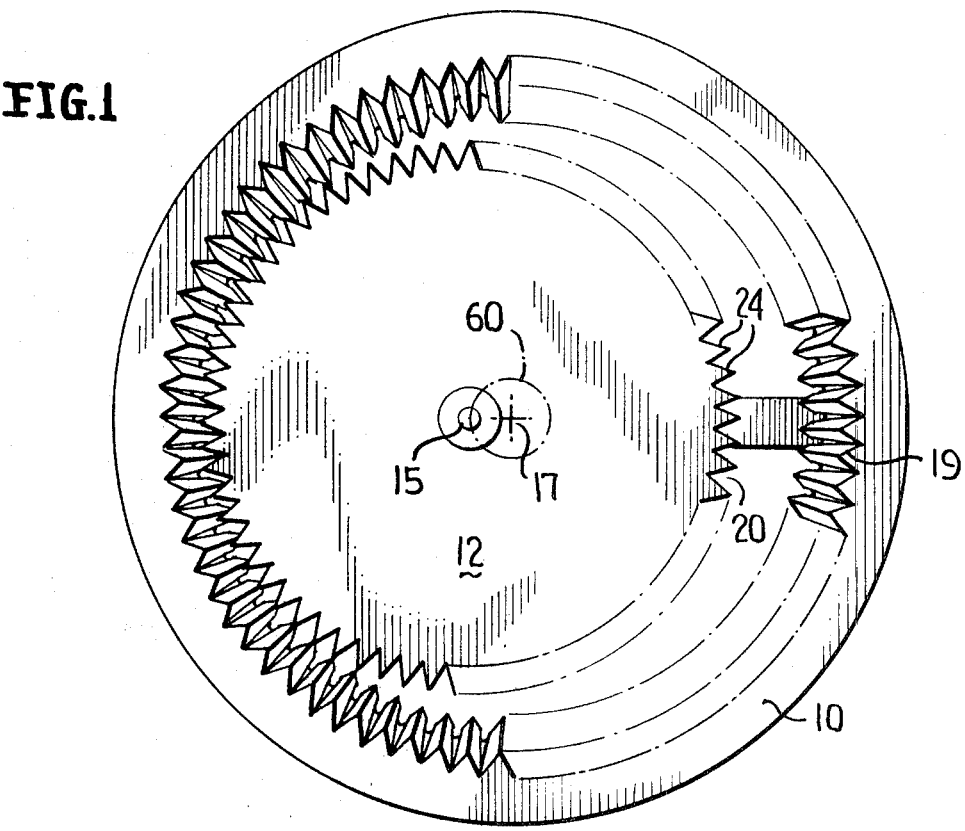
FIG. 1, is a side view in cross section of the automatic transmission.

Referring now to the drawing and particularly to FIG. 1, one preferred embodiment of the invention is illustrated. The transmission, generally designated by numeral 2, includes an input means, generally designated by numeral 4, an output means, generally designated by numeral 6, an operating means 8, and a controlled means 10, positioned between the operating means 8 and the output means 6.

The input means 4 includes an input shaft 12 which is connected to an engine (not shown), a fly wheel 16, primary sun gear 14, and a connecting shaft 18 which connects the primary sun gear to fly wheel 16 and input shaft 12. Fly wheel 16 is bolted to input shaft 12. Primary sun gear 14 is fixedly joined to shaft 18 so that primary sun gear 14, shaft 18, fly wheel 16 and input shaft 12 rotate as one unit.

The output means, indicated generally at 6, includes an output shaft 20, planet gear carrier 24, and a planetary gear cluster, generally designated by numeral 26. Output shaft 20 is bolted to planet carrier 24 by bolt 22. Planetary gear cluster 26 is freely rotatable within planet carrier 24. Primary sun gear 14 rotating with the input is directly connected to a first gear on planetary cluster 26.

A controlled means indicated generally at 10 includes a controlled shaft 28, a secondary sun gear 30, a gear ratio control gear 32 and a brake 34. Controlled shaft 28 is freely rotatable about shaft 18. Secondary sun gear 30 is directly connected to a second gear on planetary gear cluster 26. Secondary sun gear 30, controlled shaft 28, brake 34, and gear ratio control gear 32 are fixedly connected and therefore rotate as a unit about shaft 18. The controlled means is driven by the input shaft through planetary cluster 26.

Figure 2:
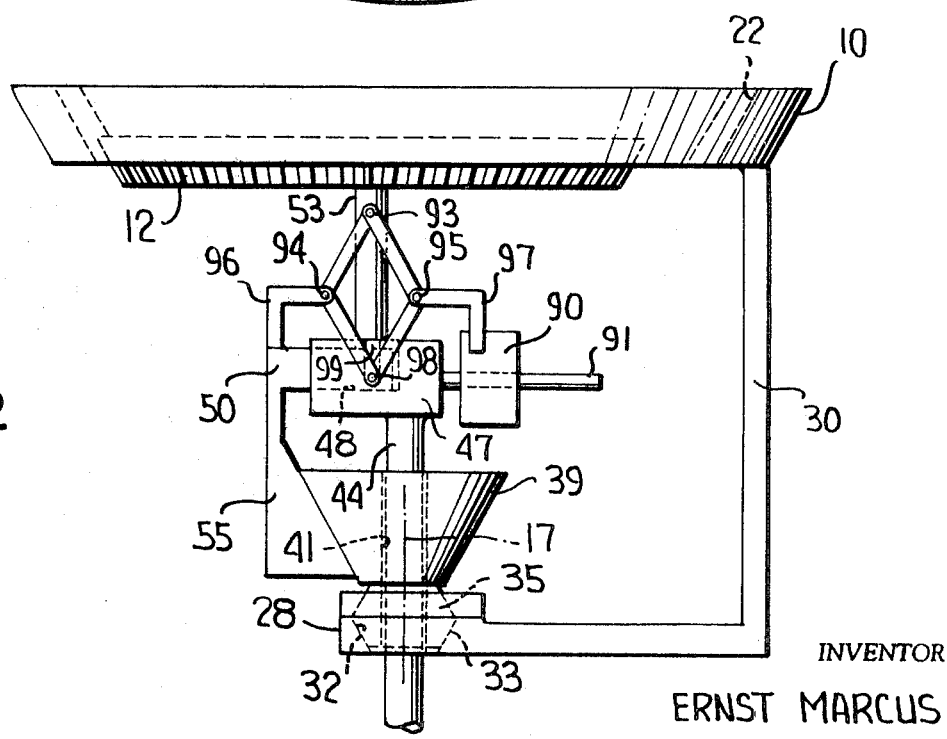
FIG. 2, is one preferred embodiment of the connecting device that locks the controlled means to the driving means.

The operating means, indicated generally at 8, is fixedly connected to fly wheel 16 and therefore rotates at input rotational speed. Basically, in the illustrated embodiment, operating means 8 frictionally couples gear ratio control gear 32 to fly wheel 16 above a predetermined input rotational speed. The operating means is constructed so that the frictional coupling force increases with increasing input shaft speed. Gear ratio control gear 32 rotates faster as the frictional coupling force increases. FIG. 2 shows one preferred embodiment of the operating mechanism 8 including counterweight 46 and two-toothed gear 42 connected to flywheel 16 by pin 44.

In operation, returning to FIG. 1, the input shaft 12 rotates fly wheel 16, shaft 18 and primary sun gear 14. Planetary gear cluster 26 will thus be rotated freely in place. Planetary cluster 26 will also rotate secondary sun gear 30, thus driving entire controlled means 10. The gear ratios of sun gear 14 and secondary sun gear 30 are chosen so that gear ratio control gear 32 rotates approximately 5° per revolution slower than fly wheel 16, which is rotating at input speed. Any appropriate rotational rate difference may be chosen depending on the intended use of the vehicle in which the transmission is installed. Returning to FIG. 2, this difference in rotational speed between gear ratio control gear 32 and fly wheel 16 will cause operating means 8 to operate in a rocking motion approximately twice each revolution. However, as the rotational velocity of fly wheel 16 increases, counterweight 46 will be driven outward radially from the center of the transmission. Thus, the frictional coupling force acting on gear ratio control gear 32 will increase with engine speed. The difference in rotational velocities between the fly wheel 16 and gear ratio control gear 32 (5° per revolution at idle speed) will cause two-toothed gear 42 to oscillate or rock approximately twice every revolution. As the centrifugal force on counterweight 46 increases, the oscillation rate will decrease, gear ratio control gear 32 will go faster, until a certain engine speed is reached where the two-toothed gear 42 will be firmly meshed with gear ratio control gear 32 and control gear 32 will rotate at the same velocity as the fly wheel 16. Returning to FIG. 1, the effect of operating means 8 increasing frictional engagement will be discussed. When gear ratio control gear 32 is forced to rotate above its normal lower driven rotational rate, secondary sun gear 30 must also rotate faster. Planetary gear cluster 26 will no longer rotate freely in one position but will be forced to walk around primary sun gear 14 and secondary sun gear 30. This rotation of planetary gear cluster 26 around primary sun gear 14 will rotate output shaft 20. When gear ratio control gear 32 is rotating at the same rate as the input shaft, direct drive will be achieved. Counterweight 46 is chosen so as to utilize maximum engine torque without overspeed. Thus, the transmission will automatically provide an infinitely variable output over a predetermined operating range that is a function of output demand and input rotation rate. An exemplary operating range might be 450—3000 R.P.M.

For operation in reverse, the rotational motion of brake member 34 is stopped relative to transmission housing 40. Thus, the entire controlled means is also stopped including secondary sun gear 30. This will force planetary gear cluster 26 to walk about primary sun gear 14 in an opposite direction to that of input rotation. Output shaft 20 will be rotated in a direction opposite that of input shaft 12.

It is noted that the only operational connection between the transmission housing and the internal mechanisms are through the input shaft and the output shaft and brake member 34. Otherwise the transmission mechanism functions completely free of the transmission housing.

Although the operating mechanism has been shown as centrifugally operated, frictional coupling device, other actuating means, such as electrical or hydraulic, are possible.

The instant invention has been shown and described herein in what is considered to be the most practical and preferred embodiment. It is recognized, however, that departures may be made therefrom within the scope of the invention.

What I claim is:
1. An automatic transmission comprising:
   a driving member;
   a flywheel axially fixed to said driving member;
   a sun gear axially fixed to said driving member;
   an output driven shaft;
   gear ratio control gear rotatably coupled about said driving shaft and having a plurality of teeth about the circumference;
   control sun gear fixed to said gear ratio control gear;
   a planet spindle rotatable coupled to said driven shaft;
   a planet cluster mounted rotatably on said spindle and having a first planet gear and a second planet gear, said first planet intermeshed with said sun gear and said second planet gear intermeshed with said control sun gear; and
   engaging control lever moveably coupled to said flywheel and having a tooth-shaped portion and positionable for frictional engagement with the circumferential teeth of said gear ratio control gear upon predetermined rotational speeds of said driving shaft.
2. A transmission as in claim 1 wherein:
   said engaging control lever having a weighted end portion opposite said tooth-shaped end portion and pivotably coupled to said flywheel whereby pivotal movement of said lever is a function of the centrifugal force on said weighted portion arising from rotation on said flywheel.